(12) United States Patent
Coatantiec et al.

(10) Patent No.: US 7,295,635 B2
(45) Date of Patent: Nov. 13, 2007

(54) METHOD OF SIGNAL PROCESSING IN THE PRESENCE OF INTERFERENCE

(75) Inventors: Blandine Coatantiec, Bourg les Valence (FR); Marc Revol, Upic (FR); Nicolas Martin, Bourg les Valence (FR); Jean-Luc Issler, Toulouse (FR)

(73) Assignee: Thales, Neuilly-sur-Seine (FR)

( * ) Notice: Subject to any disclaimer, the term of this patent is extended or adjusted under 35 U.S.C. 154(b) by 328 days.

(21) Appl. No.: 10/507,742

(22) PCT Filed: Mar. 7, 2003

(86) PCT No.: PCT/FR03/00744

§ 371 (c)(1),
(2), (4) Date: Sep. 15, 2004

(87) PCT Pub. No.: WO03/081798

PCT Pub. Date: Oct. 2, 2003

(65) Prior Publication Data

US 2005/0169409 A1 Aug. 4, 2005

(30) Foreign Application Priority Data

Mar. 22, 2002 (FR) .................................. 02 03633

(51) Int. Cl.
*H03D 1/04* (2006.01)

(52) U.S. Cl. ...................... 375/346; 375/144; 375/145; 375/148

(58) Field of Classification Search ................. 375/148, 375/346

See application file for complete search history.

(56) References Cited

U.S. PATENT DOCUMENTS

| | | | | |
|---|---|---|---|---|
| 5,084,901 A | * | 1/1992 | Nagazumi | 375/139 |
| 5,223,843 A | * | 6/1993 | Hutchinson | 342/352 |
| 5,343,210 A | * | 8/1994 | Marcuard | 342/352 |
| 5,535,278 A | * | 7/1996 | Cahn et al. | 380/274 |
| 5,901,183 A | * | 5/1999 | Garin et al. | 375/343 |
| 5,923,287 A | * | 7/1999 | Lennen | 342/357.06 |
| 6,021,156 A | | 2/2000 | Wagner | |
| 6,031,882 A | * | 2/2000 | Enge et al. | 375/343 |
| 6,125,135 A | * | 9/2000 | Woo et al. | 375/130 |

(Continued)

FOREIGN PATENT DOCUMENTS

EP 1061545 A 12/2000

(Continued)

*Primary Examiner*—David C. Payne
*Assistant Examiner*—Leon-Viet Q Nguyen
(74) *Attorney, Agent, or Firm*—Lowe Hauptman Ham & Berner, LLP

(57) ABSTRACT

The invention relates to methods of processing signals subjected to interference. It consists, when this signal is formed of a first wideband channel and of a second narrowband channel modulating one and the same carrier in which these signals are cut off for the duration of the interference, in using a single phase loop and a single code loop to process these two channels simultaneously. It makes it easier to process signals in satellite based navigation systems of the GPS type when they are scrambled by the DME-type distance measuring system signals, as well as more generally making it possible to increase the robustness of the processing by joint processing of the bands broadcast to the users.

4 Claims, 2 Drawing Sheets

U.S. PATENT DOCUMENTS

| | | | |
|---|---|---|---|
| 6,160,841 A * | 12/2000 | Stansell et al. | 375/148 |
| 6,195,328 B1 * | 2/2001 | Tsui et al. | 370/210 |
| 6,272,189 B1 * | 8/2001 | Garin et al. | 375/343 |
| 6,311,129 B1 * | 10/2001 | Lin | 701/214 |
| 6,317,078 B1 | 11/2001 | Renard et al. | |
| 6,483,867 B1 * | 11/2002 | Mannermaa | 375/149 |
| 6,516,021 B1 * | 2/2003 | Abbott et al. | 375/150 |
| 6,588,117 B1 | 7/2003 | Martin et al. | |
| 6,762,714 B2 * | 7/2004 | Cohen et al. | 342/357.12 |
| 2001/0017599 A1 * | 8/2001 | Yule et al. | 342/357.06 |
| 2001/0043644 A1 * | 11/2001 | Dooley et al. | 375/150 |
| 2002/0015439 A1 * | 2/2002 | Kohli et al. | 375/148 |
| 2002/0084933 A1 * | 7/2002 | Krasner | 342/357.01 |
| 2003/0231580 A1 * | 12/2003 | Martin et al. | 370/203 |
| 2004/0017867 A1 * | 1/2004 | Thomas et al. | 375/346 |
| 2004/0071196 A1 * | 4/2004 | Marsden et al. | 375/147 |
| 2004/0184516 A1 * | 9/2004 | Kohli et al. | 375/150 |

FOREIGN PATENT DOCUMENTS

FR        02 04349        12/2002

* cited by examiner

METHOD OF SIGNAL PROCESSING IN THE PRESENCE OF INTERFERENCE

CROSS-REFERENCE TO RELATED APPLICATIONS

The present Application is based on International Application No. PCT/FR03/00744, filed on Mar. 7, 2003, entitled "METHOD FOR TREATING A SIGNAL IN THE PRESENCE OF INTERFERENCE", which in turn corresponds to French Application FR 02/03633filed on Mar. 22, 2002, and priority is hereby claimed under 35 USC §119 based of these applications. Each of these applications are hereby incorporated by reference in their entirety into this application.

FIELD OF THE INVENTION

The present invention relates to methods of signal processing in the presence of interference, more particularly when this signal is composed of a single carrier modulated according to two frequency bands, one wide and the other narrow, and when the interference consists of discrete spectral lines originating for example from pulses distributed according to a quasi-random mode. More generally, the invention makes it possible to increase the robustness of the processing of satellite based navigation signals composed of a carrier modulated by two frequency bands.

DESCRIPTION OF THE RELATED ART

The invention applies in particular in this framework to the so-called E5b band modulation of the satellite based navigation systems currently under study, and when these systems are scrambled by the signals of so-called DME distance measuring systems. It applies also to other frequency bands, such as L1, L2, G1, G2, E6, C and possibly L5. These bands are those of the GPS, GLONASS and GALILEO systems. To simplify the description, the latter will be limited in the remainder of this text to the so-called E5 signal provided for the Galileo navigation system, when the latter is scrambled by interference originating from the signals of the DME type distance measuring system, which is generally coupled with VOR beacons.

The spectrum of this signal is represented in FIG. 1. It is formed by a first signal having a main lobe in a narrow band called NB of 2 MHz for example and by a second signal having a main lobe in a wide band called WB of 20 MHz for example, on carriers at the frequency F0. In the example considered the power emitted is distributed equally between the wide and narrow bands, so that for identical power on the two signals, the main lobe of the spectrum in the case of the wide band is not as high as in the case of the narrow band, as may be seen in the figure. The frequencies of the spreading codes are synchronized between the wide band and the narrow band and the data streams are the same between these two bands. These signals are therefore synchronous and in phase (possibly in quadrature). The narrowband signal may be of the BPSK (Binary Phase Shift Keying) or BOC (Binary Offset Carrier) type, while the wideband signal may also be of the BPSK or BOC type.

Given the powers involved in satellites on the one hand, and in DME systems on the other hand, the DME unwanted signals cause interference spectral lines whose power is appreciably greater than useful signals.

To eliminate the scrambling originating from these DME signals, it is known to perform a processing in which the signal received is cut off when such a scrambling signal is detected, this quite obviously entailing a disturbance to the reception of the useful signals. This system is known by the term "blanking".

According to the number of DME signals received, the proportion of cutoffs, or of "blanking", is greater or lesser and ultimately one no longer receives enough signal and there is then no means of recovering a useful signal.

In practice, such a useful signal is nevertheless obtained and it can be processed and the desired information can be derived from it.

SUMMARY OF THE INVENTION

To improve the results, the invention proposes a method of signal processing in the presence of interference, this signal comprising a first wideband channel and a second narrowband channel modulating one and the same carrier, in which single phase loop and a single code loop to process the two channels simultaneously.

According to another characteristic, in the phase loop a signal is generated at the frequency of the carrier, it is sine and cosine phase-shifted and the first channel and the second channel are demodulated synchronously with these two phase-shifted signals so as to obtain a signal $I_{WB}$ and a signal $Q_{WB}$ and a signal $I_{NB}$ and a signal $Q_{NB}$ respectively.

According to another characteristic, in the code loop a signal is generated at the frequency of the code of the wideband signal, a first punctual code and a first $\Delta$ code are generated on the basis of this signal, the first $\Delta$ code is multiplied respectively with the signal $I_{NB}$ and the signal $Q_{NB}$, the first punctual code is multiplied with the signal $I_{NB}$ and the signal $Q_{NB}$, the signals resulting from these multiplications are integrated to obtain signals $I_{PNB}$, $I_{\Delta NB}$, $Q_{PNB}$ and $Q_{\Delta NB}$, a second $\Delta$ signal and a second punctual signal are generated on the basis of the code frequency signal, the second $\Delta$ signal is multiplied respectively with the signal $I_{WB}$ and the signal $Q_{WB}$, the second punctual signal is multiplied by the signal $I_{WB}$ and the signal $Q_{WB}$, and the signals resulting from these multiplications are integrated to obtain signals $I_{PWB}$, $I_{\Delta WB}$, $Q_{PWB}$ and $Q_{\Delta WB}$.

According to another characteristic, the signals $I_{PWB}$, $I_{\Delta WB}$, $Q_{PNB}$ and $Q_{\Delta NB}$ are used in a first phase discriminator common to the two signals, wideband and narrowband, to obtain the phase of the carrier and to drive, after filtering, the oscillator making it possible to obtain said signal at the frequency of the carrier.

According to another characteristic, in the first phase discriminator the input signals are mixed before the discrimination proper according to proportions determined by the formulae:

$$I_{p\ opt} = \alpha I_{p\ WB} + \beta I_{p\ NB}$$

$$Q_{p\ opt} = \alpha Q_{p\ WB} + \beta Q_{p\ NB}$$

According to another characteristic, the parameters $\alpha$ and $\beta$ are determined by the formulae:

$$\alpha = \frac{\sigma_{NB}^2}{\sigma_{NB}^2 + \sigma_{WB}^2}$$

$$\beta = \frac{\sigma_{WB}^2}{\sigma_{NB}^2 + \sigma_{WB}^2}$$

in which the parameters $\sigma_{NB}$ and $\sigma_{WB}$ are estimated on the basis of the number of samples deleted C and of the total number of samples $N_0$ by the formulae:

$$\sigma_{wb}^2 = 1/(C/N_{0\ WB})$$

$$\sigma_{Nb}^2 = 1/(C/N_{0\ NB})$$

According to another characteristic, the signals $I_{PWB}$, $I_{\Delta WB}$, $Q_{PWB}$, $Q_{\Delta WB}$, $I_{PNB}$, $I_{\Delta NB}$, $Q_{PNB}$ and $Q_{\Delta NB}$ are used in a second phase discriminator common to the two channels, wideband and narrowband, to obtain the setting of the two codes and to drive, after filtering, the oscillator making it possible to obtain said signal at the code frequency.

According to another characteristic, in the second phase discriminator the input signals are mixed before the discrimination proper according to proportions determined by the formulae:

$$I_{\Delta opt}=(aI_{\Delta WB}+bI_{\Delta NB})$$

$$Q_{\Delta opt}=(aQ_{\Delta WB}+bQ_{\Delta NB})$$

According to another characteristic, the parameters a and b are determined by the formulae:

$$a = \frac{\rho_{WB}^2 \sigma_{NB}^2}{(\rho_{NB}^2 \sigma_{WB}^2 + \rho_{WB}^2 \sigma_{NB}^2)} \times \frac{1}{S_{WB}}$$

$$b = \frac{\rho_{NB}^2 \sigma_{WB}^2}{(\rho_{NB}^2 \sigma_{WB}^2 + \rho_{WB}^2 \sigma_{NB}^2)} \times \frac{1}{S_{NB}}$$

in which the terms $S_{WB}$ and $S_{MB}$ correspond to the slopes of the response curves of the discriminators as measured at the central level of these curves, and the terms $\rho_{WB}$ and $\rho_{MB}$ are the normalized slopes of the discriminators as obtained by dividing the slope S by a factor $\sigma_\Delta$ determined by the formula:

$$\sigma_\Delta = [1-A(2d)]$$

in which A is the normalized authorization function of the filtered spreading code such that A(0)=1, and 2d is the value of the deviation between the early code and the late code used to generate the $\Delta$ code.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

Other features and advantages of the invention will become clearly apparent in the following description, presented by way of nonlimiting example and with regard to the appended figures which represent.

DETAILED DESCRIPTION OF THE INVENTION

Figure 1:
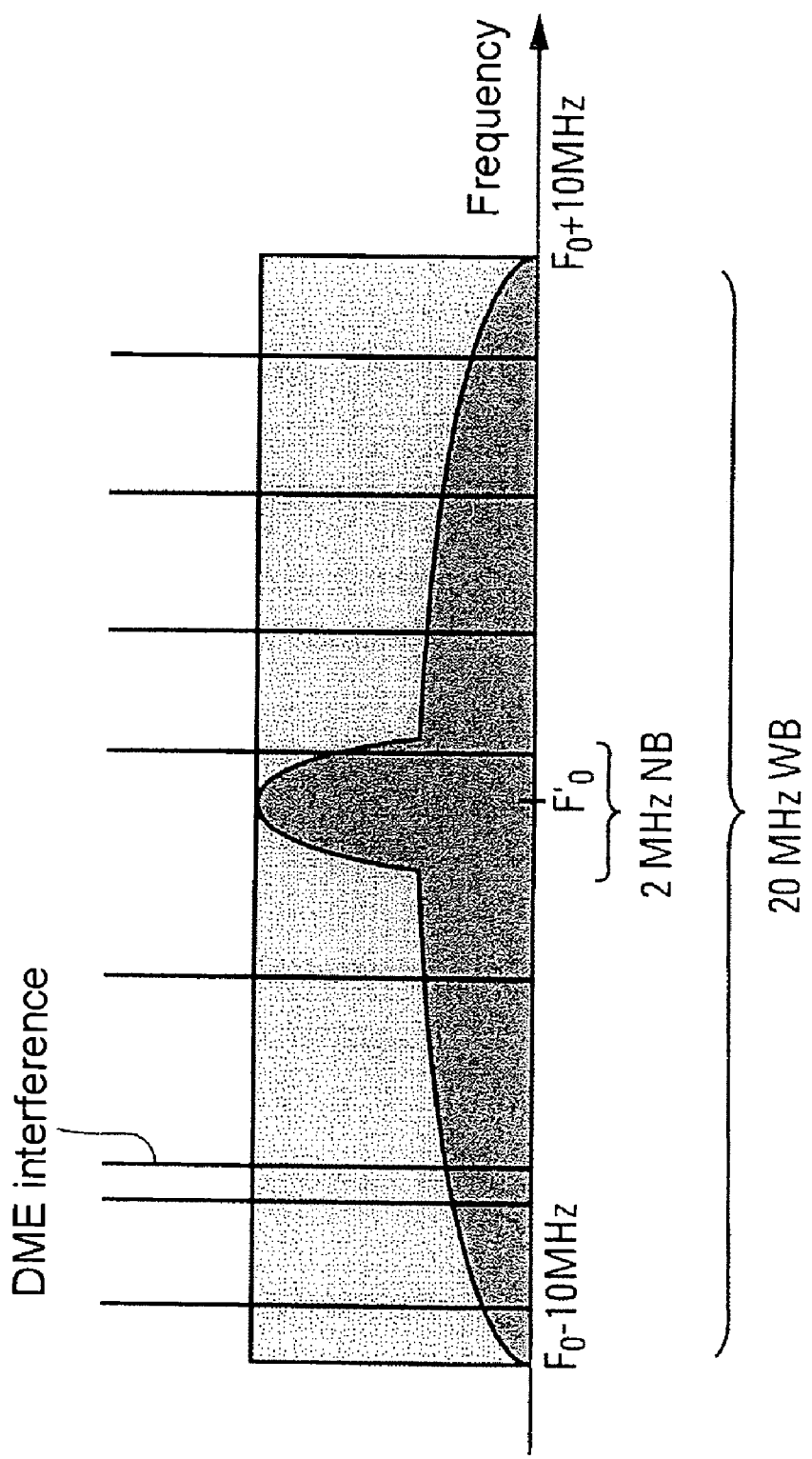
FIG. 1, a graph of the spectrum of the signal to be processed.
Figure 2:
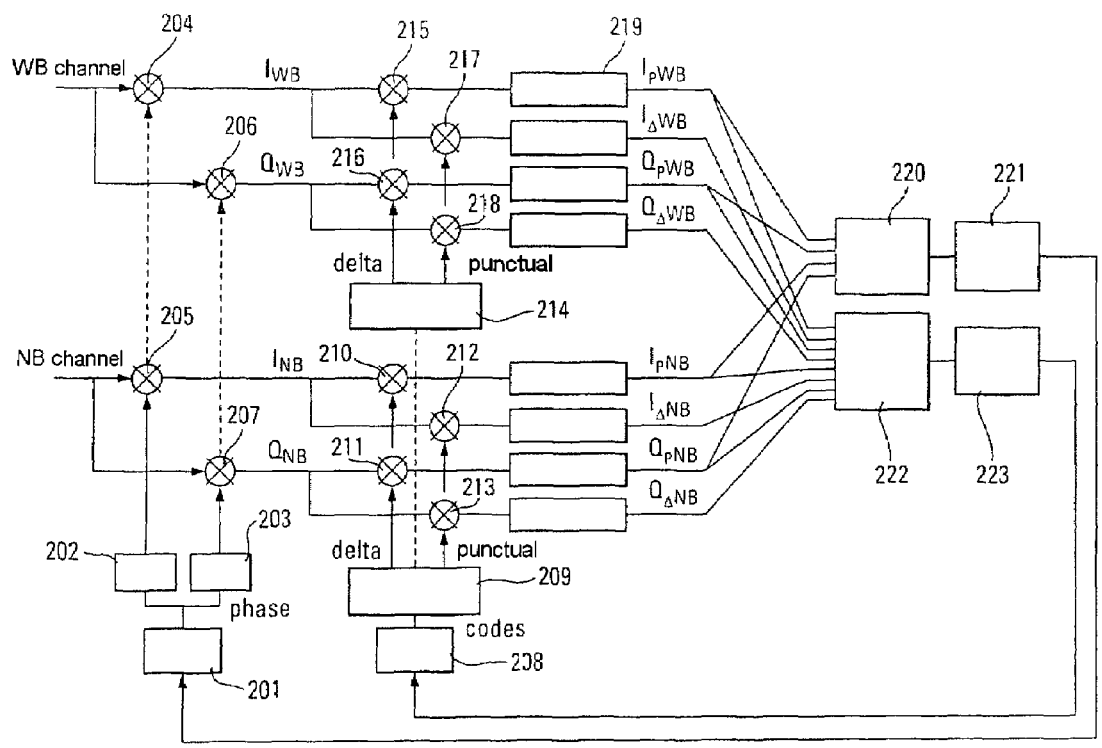
FIG. 2, a block diagram of a device allowing the implementation of the method according to the invention.

The input signals of the device making it possible to implement the invention are filtered in standard fashion, retaining in the case of the wideband signal the whole of the main lobe of the spectrum, so as to preserve the accuracy of the code, and eliminating the sidelobes of the narrowband signal insofar as they exist. This makes it possible to limit the probability of interference by the DME signals, which are statistically distributed over the whole band. As may be seen in FIG. 1, a large part of the DME signals are situated outside the main lobe of the narrowband signal and the temporal occupancy of DME interference is statistically ten times smaller for the narrow band than for the wide band, in the example considered.

If the "blanking" technique is then used, the losses, expressed as the number of samples C deleted over the total number of samples N0 are given by:

$$C/N_0 = 1-\theta \quad (1)$$

and in decibels by:

$$C/N_{0dB} = 10 \log(1-\theta) \quad (2)$$

In this formula, $\theta$ is the proportion of cutoff time, which is statistically 10 times smaller for the narrowband signal than for the wideband signal, if the filtering described above is performed properly.

The output of the phase loop, which will be described later, is applied to a digitally controlled oscillator 201 which delivers a signal at the frequency of the carrier. This signal is then sine and cosine phase-shifted in two phase-shifters 202, 203.

The cosine signal is then applied to the wideband signal in a multiplier 204 and to the narrowband signal in a multiplier 205.

The sine signal is applied to the wideband signal in a multiplier 206 and to the narrowband signal in a multiplier 207.

The carrier is thus demodulated on each channel so as to obtain on each of these channels the signals known conventionally as I and Q.

The output of the code loop, which will be described later, is applied to a digitally controlled oscillator 208 which delivers a signal at the frequency of the code of the wideband signal. The latter is applied to a first spreading code generator 209 which delivers on the one hand the so-called punctual code and on the other hand the so-called $\Delta$ code, corresponding to the difference between a late code and an early code, these codes being adapted to that received on the narrowband channel.

The $\Delta$ code is multiplied with the signal I of the narrowband channel in a multiplier 210 and with the signal Q of the same channel in a multiplier 211.

The punctual code is multiplied with the signal I of this narrowband channel in a multiplier 212 and with the signal Q of the same channel in a multiplier 213.

The code frequency signal output by the oscillator 208 is also applied to a second code signal generator 214, similar to the generator 209 but adapted to the code present on the wideband channel. It too delivers a punctual code and a $\Delta$ code.

The $\Delta$ code is multiplied with the signal I of the wideband channel in a multiplier 215 and with the signal Q of the same channel in a multiplier 216.

The punctual signal is multiplied with the channel I of this wideband channel in a multiplier 217 and with the signal Q of this channel in a multiplier 218, The signals output by all these multipliers are integrated in an assembly of integrators 219, one for each signal resulting from the multiplications.

In the wideband channel, the signals discharged by the integrators are respectively $I_{pWB}$, $I_{\Delta WB}$, $Q_{pWB}$, $Q_{\Delta WB}$, this notation signifying that one is dealing with the I or Q signal for the punctual code or the Δ code in the wideband channel.

In the same manner, the integrators of the narrowband channel discharge four signals $I_{pNB}$, $I_{\Delta NB}$, $Q_{pNB}$, $Q_{\Delta NB}$.

According to the invention, these signals are used in two different phase discriminators, which are however common to the two signals, wideband and narrowband, one 220 to obtain the phase of the carrier and the other 222 to obtain the setting of the two codes of the channels.

According to the invention, the phase discriminator 220 can use a technique known by the name extended discriminator, more adapted in aeronautical applications so as to be able to support a very wide dynamic range.

Conventionally, such a discriminator operates on the basis of a I signal and of a Q signal, and according to the invention these signals are optimized signals called Ip opt and Qp opt obtained by mixing the signals $I_{pWB}$, $Q_{pWB}$, $I_{pNB}$, and $Q_{pNB}$ using the formulae:

$$I_{p\,opt} = \alpha I_{p\,WB} + \beta I_{pNB} \qquad (3)$$

$$Q_{p\,opt} = \alpha Q_{p\,WB} + \beta Q_{p\,NB} \qquad (4)$$

In these formulae α and β are given by:

$$\alpha = \frac{\sigma_{NB}^2}{\sigma_{NB}^2 + \sigma_{WB}^2} \qquad (5)$$

$$\beta = \frac{\sigma_{WB}^2}{\sigma_{NB}^2 + \sigma_{WB}^2} \qquad (6)$$

The parameters $\sigma_{NB}$ and $\sigma_{WB}$ correspond respectively to the noise levels on the wideband channel and on the narrowband channel. They are estimated on the basis of the parameters C/N0 through the formulae:

$$\sigma_{wb}^2 = 1/(C/N_{0\,WB}) \qquad (7)$$

$$\sigma_{Nb}^2 = 1/(C/N_{0\,NB}) \qquad (8)$$

The weightings which are thus applied make it possible to optimize the ratio $C/N_0$ in the loop. Specifically, the level of the signal is the same in the two channels by assumption, but the scrambling levels are different because the DME interference effect depends on the bandwidth of the channel as was shown above.

To obtain these parameters σ, a statistical estimate is made, with the aid of a device (not represented), over samples of the signals Ip and Iq tapped off at a relatively low frequency, 1 kHz for example, carrying this estimate over several seconds, this being possible since the DME signals are constant over distances of several kilometers on account of the intrinsic characteristics of the DME system.

The signal thus obtained at the output of the discriminator 220 is filtered in a conventional manner by a filter 221, then applied to the input of the oscillator 201, this closing the phase loop.

The code discriminator uses signals IΔ and QΔ optimized on the basis of the signals $I_{\Delta WB}$, $Q_{\Delta WB}$, $I_{\Delta NB}$ and $Q_{\Delta NB}$ by applying the formulae:

$$I_{\Delta opt} = (a I_{\Delta WB} + b I_{\Delta NB}) \qquad (9)$$

$$Q_{66\,opt} = (a Q_{\Delta WB} + b Q_{\Delta NB}) \qquad (10)$$

In these formulae a and b are given by:

$$a = \frac{\rho_{WB}^2 \sigma_{NB}^2}{(\rho_{NB}^2 \sigma_{WB}^2 + \rho_{WB}^2 \sigma_{NB}^2)} \times \frac{1}{S_{WB}} \qquad (11)$$

$$b = \frac{\rho_{NB}^2 \sigma_{WB}^2}{(\rho_{NB}^2 \sigma_{WB}^2 + \rho_{WB}^2 \sigma_{NB}^2)} \times \frac{1}{S_{NB}} \qquad (12)$$

In these formulae the terms $\sigma_{WB}$ and $\sigma_{NB}$ were defined above by formulae (7) and (8). The terms $S_{WB}$ and $S_{MB}$ correspond for their part to the slopes of the response curves of the discriminators 220 and 222, these slopes being measured at the central level of this curve, which corresponds in principle to the response around the carrier frequency.

$\rho_{WB}$ and $\rho_{MB}$ are the normalized slopes of the discriminator, respectively on the wideband and narrowband channels. To obtain this normalized slope, the corresponding slope S is divided by the factor $\sigma_{66}$, representative of the standard deviation of the noise on the signals IΔ and QΔ, given by the formula:

$$\sigma_{66} = [1 - A(2d)] \qquad (13)$$

In this formula, A designates the normalized autocorrelation function of the filtered spreading code, such that A(0)=1, and 2d is the value of the deviation between the early code and the late code used to generate the Δ code.

The signal at the output of the discriminator 222 is then filtered very conventionally by a filter 223 and applied to the input of the code oscillator 208, this closing the code loop.

The robustness of the carrier loop is the same as that of the narrowband channel taken in isolation. When the ratio $C/N_0$ on the wideband channel becomes too low on account of DME interference, the overall ratio $C/N_0$ of the device tends toward that of the narrowband channel taken in isolation. The carrier loop tracking threshold is therefore actually the threshold of the narrowband channel.

The accuracy of the code loop is almost that of the wideband channel taken in isolation when the percentage of time occupancy by the interference is lower than 95%. When this percentage approaches 100%, the accuracy of the code then becomes that of the narrowband channel taken in isolation.

Between these two extremities, a synergy is noted stemming from the fact that the robustness on the carrier of one of the channels makes it possible to improve the detection of the code on the other. Stated otherwise the system according to the invention benefits from the robustness of the narrowband channel and the accuracy of the wideband channel when the level of interference remains relatively reasonable.

It will also be emphasized that the invention is particularly simple since it uses only a single carrier loop and only a single phase loop, and that it needs no logic detection system to know which of the two channels is to be used as a function of the circumstances.

It will be readily seen by one of ordinary skill in the art that the present invention fulfills all of the objects set forth above. After reading the, foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method for processing a first and a second signal, the first signal being spread over a wide band channel and the second signal being spread over a narrowband channel, and modulating one and the same carrier in a single carrier phase tracking loop controlled by a carrier phase discriminator, comprising the steps of:

generating two components sine and cosine phase shifted of a local carrier at the frequency of the carrier, demodulating the first and second signals with the sine and cosine phase shifted components of the local carrier so as to obtain a first couple of quadrature demodulated components $I_{WB}$, $Q_{WB}$ for the first wide spread signal and a second couple of quadrature demodulated components $I_{NB}$, $Q_{NB}$ for the second narrow spread signal, in a single code tracking loop controlled by a code discriminator, generating a code clock signal, on the base of the code clock signal, generating, a first punctual code and a first Δ code, and a second punctual code and a second Δ code compatible with the pseudorandom code, correlating the first couple of quadrature demodulated components $I_{WB}$, $Q_{WB}$ with the first local punctual and Δ codes in order to obtain four demoduladed and dc-spread signal components $I_{PWB}$, $I_{\Delta WB}$, $Q_{PWB}$ and $Q_{\Delta WB}$ issued from the wide channel, correlating the second couple of quadrature demodulated components $I_{NB}$, $Q_{NB}$ with the second local punctual and Δ codes in order to obtain four demodulated and de-spread signal components $I_{PNB}$, $I_{\Delta NB}$, $Q_{PNB}$ and $Q_{\Delta NB}$ issued from the narrow channel, generating an input signal for the phase discriminator mixing the demodulated and de-spread signal components $I_{PWB}$, $Q_{PWB}$, $I_{PNB}$, $Q_{PNB}$ issued from the correlations of the wide (WB) and narrow (NB) channel signals with the punctual codes, and generating an input signal for the code discriminator, mixing the demodulated and de-spread signal components $I_{PWB}$, $I_{\Delta WB}$, $Q_{PWB}$, $Q_{\Delta WB}$, $I_{PNB}$, $Q_{\Delta NB}$ issued from the correlations of the wide (WB) and narrow channel (NB) signals with the Δ codes; and wherein, the input signal for the phase discriminator has its quadrature components $I_{p\ opt}$, $Q_{p\ opt}$ defined by mixing the signal components $I_{PWB}$, $Q_{PWB}$, $I_{PNB}$, $Q_{PNB}$ issued from the correlations of the wide and narrow channel signals with the punctual codes according the formula:

$I_{p\ opt} = \alpha I_{pWB} + \beta I_{p\ NB}$ $Q_{p\ opt} = \alpha Q_{pWB} + \beta Q_{p\ NB}$ α, β being weighting parameter.

2. The method as claimed in claim 1, wherein the parameters α and β are determined by the formula:

$$a = \frac{\rho_{WB}^2 \sigma_{NB}^2}{(\rho_{NB}^2 \sigma_{WB}^2 + \rho_{WB}^2 \sigma_{NB}^2)} \times \frac{1}{S_{WB}}$$

$$b = \frac{\rho_{NB}^2 \sigma_{WB}^2}{(\rho_{NB}^2 \sigma_{WB}^2 + \rho_{WB}^2 \sigma_{NB}^2)} \times \frac{1}{S_{NB}}$$

in which the parameters $\sigma_{NB}$ and $\sigma_{WB}$ are estimated on the basis of the number of samples deleted C and of the total number of samples $N_0$ by the formula:

$\sigma_{wb}^2 = 1/(C/N_{0\ WB})$ $\sigma_{Nb}^2 = 1/(C/N_{0\ NB})$.

3. A method for processing a first and a second signal, the first signal being spread over a wide band channel and the second signal being spread over a narrowband channel, and modulating one and the same carrier in a single carrier phase tracking loop controlled by a carrier phase discriminator, comprising the steps of:

generating two components sine and cosine phase shifted of a local carrier at the frequency of the carrier.

demodulating the first and second signals with the sine and cosine phase shifted components of the local carrier so as to obtain a first couple of quadrature demodulated components $I_{WB}$, $Q_{WB}$ for the first wide spread signal and a second couple of quadrature demodulated components $I_{NB}$, $Q_{NB}$ for the second narrow spread signal, in a signal code tracking loon controlled by a code discriminator, generating a code clock signal, on the base of the code clock signal, generating, a first punctual code and a first Δ code, and a second punctual code and a second Δ code compatible with the pseudorandom code, correlating the first couple of quadrature demodulated components $I_{NB}$, $Q_{NB}$ with the first local punctual and Δ codes in order to obtain four demoduladed and de-spread signal components $I_{PNB}$, $I_{\Delta PNB}$ issued from the wide channel, correlating the second couple of quadrature demodulated components $I_{NB}$, $Q_{NB}$ with the second local punctual and Δ codes in order to obtain four demodulated and de-spread signal components $I_{PNB}$, $I_{\Delta NB}$, $Q_{PNB}$ and $Q_{\Delta NB}$ issued from the narrow channel, generating an input signal for the phase discriminator mixing the demodulated and de-spread signal components $I_{PWB}$, $Q_{PWB}$, $I_{PNB}$, $Q_{PNB}$ issued from the correlations of the wide (WB) and narrow (NB) channel signals with the punctual codes, and generating an input signal for the code discriminator, mixing the demodulated and de-spread signal components $I_{PWB}$, $I_{\Delta WB}$, $Q_{PWB}$, $Q_{\Delta WB}$, $I_{\Delta NB}$, $Q_{PNB}$, $Q_{\Delta NB}$ issued from the correlations of the wide (WB) and narrow channel (NB) signals with the Δ codes;

wherein, the input signal for the phase discriminator has its quadrature components $I_{p\ opt}$, $Q_{p\ opt}$ defined by mixing the signal components $I_{PWB}$, $Q_{PWB}$, $I_{PNB}$, $Q_{PNB}$, issued from the correlations of the wide and narrow channel signals with the punctual codes according the formula:

$Q_{p\ opt} = \alpha I_{pWB} + \beta I_{p\ NB}$ $Q_{p\ opt} = \alpha Q_{p\ WB} + \beta Q_{p\ NB}$ α, β being weighting parameter; and wherein the input signal for the code discriminator has its quadrature components $I_{\Delta opt}$, $Q_{\Delta opt}$ defined by mixing the signal components $I_{\Delta WB}$, $Q_{\Delta WB}$, $I_{\Delta NB}$, $Q_{\Delta NB}$ issued from the correlations of the wide and narrow channel signals with the Δ codes according the formula:

$I_{\Delta opt} = (\alpha I_{\Delta WB} + b I_{\Delta NB})$ $Q_{\Delta opt} = (\alpha Q_{\Delta WB} + b Q_{\Delta NB})$ a, b being weighting parameters.

4. The method as claimed in claim 3, wherein the parameters a and b are determined by the formula:

$$\alpha = \frac{\sigma_{NB}^2}{\sigma_{NB}^2 + \sigma_{WB}^2}$$

in which the terms $S_{WB}$ and $S_{MB}$ correspond to the slopes of the response curves of the discriminators as measured at the central level of these curves, and the terms $\rho_{WB}$ and $\rho_{MB}$ are the normalized slopes of the discriminators as obtained by dividing the slope S by a factor $\sigma_\Delta$ determined by the formula:

$$\sigma_\Delta = [1 - A(2d)]$$

in which A is the normalized authorization function of the filtered spreading code such that A(0)=1, and 2d is the value of the deviation between the early code and the late code used to generate the $\Delta$ code.

* * * * *